United States Patent [19]
Wang et al.

[11] Patent Number: 6,063,867
[45] Date of Patent: May 16, 2000

[54] STABLE POLYMER BLENDS FROM A TWO-STEP CROSSLINKING PROCESS

[75] Inventors: Zhi Wang, South China, China; Chi-Ming Chan, Clear Water Bay, The Hong Kong Special Administrative Region of the People's Republic of China; Jiarui Shen, Guangzhou, China

[73] Assignee: The Hong Kong University of Science & Technology, The Hong Kong Special Administrative Region of the People's Republic of China

[21] Appl. No.: 09/022,638

[22] Filed: Feb. 12, 1998

[51] Int. Cl.$^7$ .............................. C08L 23/30; C08L 53/00
[52] U.S. Cl. .............................. 525/71; 525/99; 525/273; 525/333.8; 525/387
[58] Field of Search ................................ 525/71, 99, 273, 525/333.8, 387

[56] References Cited

U.S. PATENT DOCUMENTS

| | | | |
|---|---|---|---|
| 4,386,188 | 5/1983 | Grancio et al. | 525/99 |
| 4,464,439 | 8/1984 | Castelein | 428/517 |
| 5,159,016 | 10/1992 | Inoue et al. | 525/92 |
| 5,250,618 | 10/1993 | Fasulo et al. | 528/89 |
| 5,278,232 | 1/1994 | Seelert et al. | 525/71 |
| 5,334,657 | 8/1994 | Swartzmiller et al. | 525/71 |
| 5,461,111 | 10/1995 | Modic et al. | 525/71 |
| 5,516,845 | 5/1996 | Heese et al. | 525/194 |
| 5,532,315 | 7/1996 | Bonekamp et al. | 525/71 |
| 5,539,052 | 7/1996 | Shieh et al. | 525/92 |

FOREIGN PATENT DOCUMENTS

| | | |
|---|---|---|
| 0042153 | 12/1981 | European Pat. Off. . |
| 56-36534 | 4/1981 | Japan . |
| 61-141743 | 6/1986 | Japan . |
| 2-138350 | 5/1990 | Japan . |
| 6-192493 | 7/1994 | Japan . |

*Primary Examiner*—James J. Seidleck
*Assistant Examiner*—Olga Asinovsky
*Attorney, Agent, or Firm*—Burns, Doane, Swecker & Mathis, L.L.P.

[57] ABSTRACT

The present invention provides a method for creating durable blends of polystyrene and polyolefin. The blends of the present invention have improved mechanical properties evidenced by measurement of impact strength, tensile strength, and elongation at break. Polyolefin is first crosslinked by creating a melt of polyolefin and a small amount of peroxide in a mixer at elevated temperature. The crosslinked polyolefin is then melt-blended with polystyrene at elevated temperature. Finally, a styrene-butadiene-styrene block copolymer is mixed into the melt. The method of the present invention can be applied to various blend systems of otherwise incompatible polymers provided it contains at least one component and a compatibilizer that are crosslinkable.

8 Claims, 6 Drawing Sheets

STABLE POLYMER BLENDS FROM A TWO-STEP CROSSLINKING PROCESS

FIELD OF THE INVENTION

The present invention is directed to stable blends of polystyrene (PS), polyethylene (PE), and, optionally, polypropylene (PP). The blends are created by a two-step process that includes crosslinking the various polymers with styrene-butadiene-styrene (SBS) in the presence of dicumyl peroxide or other crosslinking agent (e.g. other peroxides). The resulting blends have improved mechanical properties.

BACKGROUND

Polymer blending has great potential for the development of new materials with special properties for various applications. Successful polymer blending can also yield great ecological and economic advantages. The polymers used in the blends of the present invention are found in great quantities in the post-consumer waste stream. Thus, the "raw materials" of these blends are plentiful and inexpensive.

Typically, however, the simple mechanical mixing or blending of two or more polymers results in poor mechanical properties because most polymers are incompatible. Consequently, much effort and capital has been expended in devising methods for compatibilizing polymers and formulating polymer blends.

Polyethylene and polystyrene are two of the most common, and therefore commercially significant, polymers. Consequently, it has long been the object of research and development efforts to devise reliable and economical means for generating stable and compatible PS/PE blends with improved mechanical properties. See, e.g., W. M. Barentsen and D. Heiken, *Polymer* 14, 579 (1973); C. E. Locke and D. R. Paul, *J. Appl. Polym. Sci.* 13, 308, (1983); R. Fayt, R. Jerome and Ph. Teyssie, *J. Polym. Sci., Polym. Lett. Edn.* 19, 79 (1981); R. Fayt, R. Jerome and Ph. Teyssie, J. Polym. Sci., *Polym. Phys. Edn.* 20, 2209 (1982); R. Fayt, R. Jerome and Ph. Teyssie, *Makromol. Chem.* 187, 837 (1986); R. Fayt, R. Jerome and Ph. Teyssie, *J. Polym. Sci., Polym. Lett. Edn.* 24, 25 (1986); R. Fayt, R. Jerome and Ph. Teyssie, *J. Polym. Sci., Polym. Phys. Edn.* 27, 775 (1989); R,. Fayt, R. Jerome and Ph. Teyssie, *Polym, Eng. Sci.* 30, 937 (1990); R. Fayt, R. Jerome and Ph. Teyssie, *J. Polym. Sci., Polym. Phys. Edn.* 33, 801 (1995); C. R. Lindsay, D. R. Paul and J. W. Barlow, *J. Appl. Polym. Sci.* 26, 1 (1981); M. C. Schwarz, H. Keskkel, J. E. Barlow and D. R. Paul, *J. Appl. Polym. Sci.* 35, 653 (1988); M. C. Schwarz, J. W. Barlow and D. R. Paul, *J. Appl. Polym. Sci.* 35, 403 (1988); W. E. Baker and M. Saleem, *Polymer* 28, 2057 (1987); M. Saleem and W. E. Baker, *J. Appl. Polym. Sci.* 39, 655 (1990); J. W. Teh and A. Rudin, *Polym. Eng. Sci.* 31, 1033 (1991); J. W. Teh and A. Rudin, *Polym. Eng. Sci.* 32, 1678 (1992); P. V. Ballegooie and A. Rudin, *Polym. Eng. Sci.* 28, 1434 (1988) (all incorporated herein by reference).

One of the most frequently used methods to compatibilize PS/PE blends is the incorporation of a block copolymer such as a block copolymer of polystyrene and polyethylene (PS-b-PE) or a graft copolymer such as polystyrene-g-polyethylene (PS-g-PE) as a compatibilizer. The beneficial effects of the compatibilizer on the morphological and mechanical behavior of the blends is well demonstrated. A small amount of the compatibilizer reduces the phase size, stabilizes the phase morphology against coalescence, and increases the interfacial adhesion. The effects of the molecular weight, the composition, and the molecular structure of the copolymer on the blend miscibility or compatibilization have also been extensively studied. However, the costs of synthesizing these tailor-made compatibilizers make this route commercially unattractive.

Another popular approach has been to introduce reactive groups onto each of the two polymers to be blended. These functionalized polymers can then form the required compatibilizer during a subsequent reactive extrusion. However, this approach also requires separate processes to produce the functionalized polymers.

An alternative to that approach that has been investigated is the use of peroxide-initiated functionalization leading to grafting or cross-linking reactions. But that alternative proved to have limited success because of difficulties in achieving optimum conditions with minimum levels of intra-species crosslinking of PS and PE, and because of chain degradation.

U.S. Pat. No. 3,445,543 (incorporated herein by reference) describes high impact polymer compositions of monovinyl substituted aromatics. The '543 patent describes a blend of: a homopolymer of a monovinyl substituted aromatic compound such as styrene; a block copolymer such as those formed of a minor amount of a conjugated diene (e.g., butadiene) and a major amount of a monovinyl substituted aromatic compound (e.g., styrene); and a rubbery ethylene-1-olefin polymer (e.g., ethylene-propylene copolymer). The '543 patent teaches that the homopolymer, block copolymer, rubbery ethylene-1-olefin polymers, and cross-linking agent can be mixed together in any order and heated to effect cross-linking. However, as demonstrated below, the mechanical properties of blends resulting from the random combination of such components are variable and suboptimal. More particularly, those blends are acknowledged as having improved aging properties, but not improved impact strength, tensile strength or elongation. (See Table II)

U.S. Pat. No. 4,469,847 (incorporated herein by reference) describes graft styrene copolymers from a two-stage polymerization of styrene in the presence of an ethylene/propylene/polyene monomer (EPDM) elastomer and a styrene block copolymer. The two-stage process involves prepolymerizing styrene in the presence of an elastomeric EPDM terpolymer and styrene block copolymer, until polymerization is about 20% complete; and effecting a suspension polymerization of the resultant mixture in the presence of water such that the weight ratio of organic phase:water phase is from 0.8:1 to 1.3:1. Such two-stage polymerization processes are inefficient due to the necessity for monitoring the reactants and properly timing and implementing the various stages of the process.

Despite the foregoing, the art lacks a simple, expedient, and reliable process for blending otherwise incompatible polymers such as polyethylene and polystyrene to produce materials having desirable mechanical properties.

SUMMARY OF THE INVENTION

The present invention provides an efficient and reliable method for blending polystyrene, polyethylene, and, optionally, polypropylene. The method includes a sequential introduction of the various components, and the crosslinking of the various components with a cross-linking agent such as dicumyl peroxide (DCP).

More specifically, PE is first crosslinked in the melt at high temperatures by using a small amount of DCP. The partially crosslinked PE is then melt-mixed with PS and styrene-butadiene-styrene block copolymer (SBS). By controlling the processing parameters and procedures, the residual free radicals in PE will react with the butadiene component of SBS at the interface. This reaction will enhance the adhesion between PS and PE phases, leading to improved mechanical properties.

We have investigated, and describe below, the morphology and mechanical properties of various PS/PE blends compatibilized by the method of the present invention.

The methods of the present invention can be applied to other polymer blend systems that have one of these components and a compatibilizer that can be crosslinked with a curing agent.

DETAILED DESCRIPTION OF THE INVENTION

Figure 1:
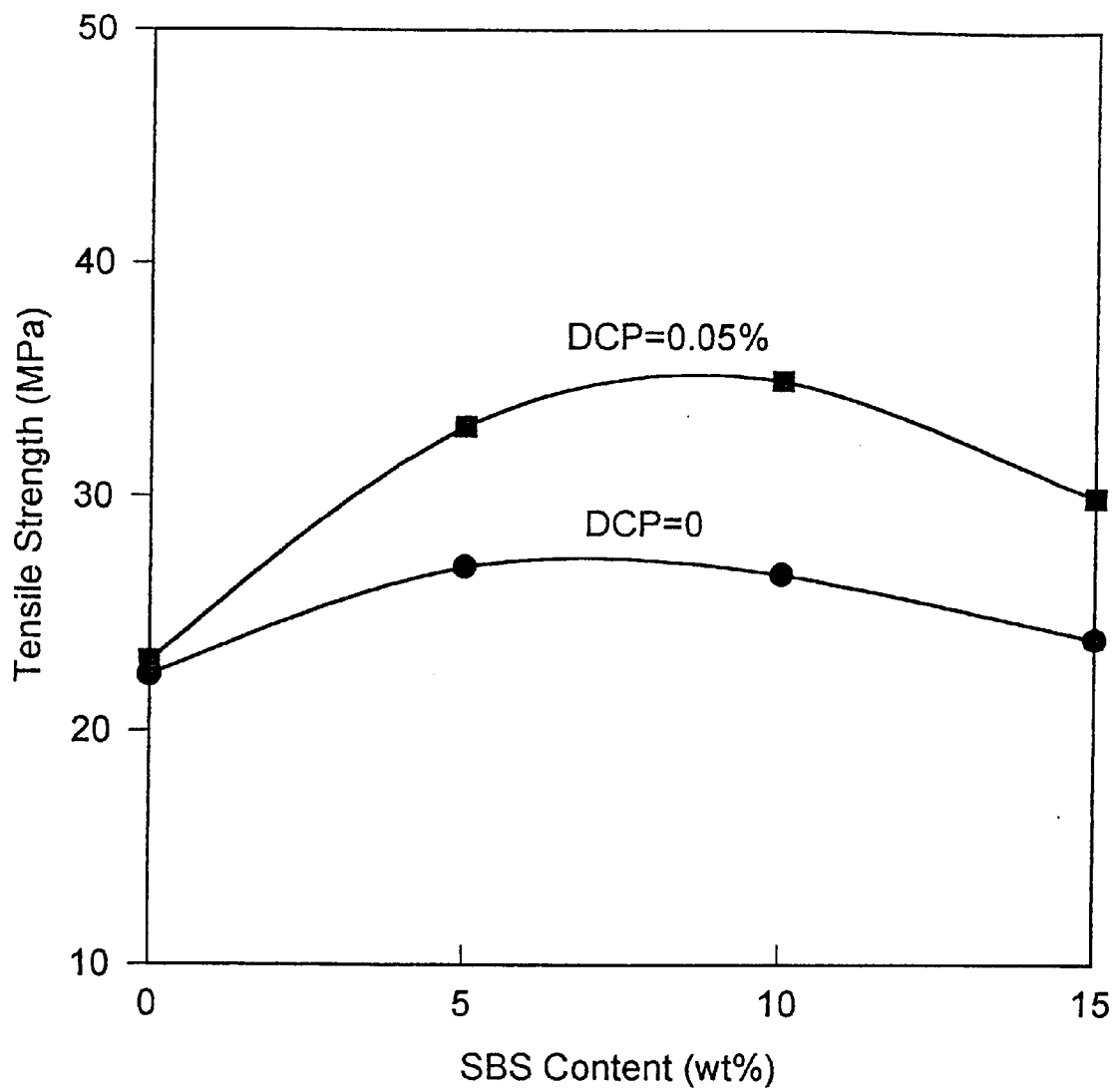
FIG. 1 is a graphical comparison of the tensile strength of non-crosslinked PS/PE blends and PS/PE blends prepared by the present two-step crosslink process as a function of SBS concentration.

The present invention provides a method for creating durable cross-linked polymer blends of otherwise incompatible polymers. The otherwise incompatible polymers are polyolefins and polymers of monovinyl substituted aromatic compounds such as polystyrenes. The preferred polyolefins include polyethylene, polypropylene, and mixtures thereof.

The blends produced by the methods of the present invention can be fabricated to possess various mechanical properties not heretofore attainable. For example, these blends can be fabricated to have especially high impact strength (J/m), tensile strength (MPa), and elongation at break (%). It is also an advantage of the blends of the present invention that they can be fabricated to have the unusual combination of especially high values for all three of the foregoing mechanical properties.

The methods of the present invention include creating a melt by mixing dicumyl peroxide and a polyolefin selected from the group consisting of polyethylene, polypropylene, and mixtures thereof in a heated vessel; creating a subsequent melt by mixing the product of the melt of polyolefin and dicumyl peroxide with a homopolymer of a monovinyl substituted aromatic compound in a heated vessel; and subsequently adding a block copolymer to the melt with continued mixing.

Although variations on the following can be devised by routine investigation in light of the present disclosure, it is preferred that the PS/PE weight ratio be about 4/1 (80/20); the quantity of dicumyl peroxide will be about 0.01 to about 0.1 wt %; and the quantity of block copolymer will be about 5 to about 15 wt %. When the PS/PE weight ratio is about 4/1, the dicumyl peroxide will preferably be added in quantities of about 0.04 to about 1.0 wt %, and more preferably about 0.08 to about 0.1 wt %; and the block copolymer will preferably be a styrene-butadiene-styrene block copolymer, added to the reaction mixture in quantities of about 5 to about 15 wt %, and more preferably about 10 to about 15 wt %. As can be seen from FIGS. 1–6, varying quantities of DCP and SBS, occasionally inconsistent with the foregoing, will be preferred depending upon the particular constellation of mechanical properties desired.

Materials

Polystyrene (PS 666 from Asahi Chemical Co. Ltd.), low-density polyethylene (LDPE 2F4B from Shanghai Petrochemical Co.), styrene-butadiene-styrene block copolymer (SBS 791 from Yueyang Petrochemical Co.), and dicumyl peroxide (from Shanghai Chemical Supply Co.) were used. All materials were commercially available and used without further purification. The composition of the blend was fixed at a weight ratio of 80/20 (PS/PE). The SBS and DCP contents varied from 5 to 15 wt %, and from 0.01 to 0.1 wt %, respectively, based on the total weight of PS and LDPE.

Sample Preparation

Mixing was performed using a Haake Rheomixer. The process temperature was set at 165° C. and the roller blades were operated at 30 rpm. LDPE and DCP were introduced into the preheated mixing chamber through a chute. After five minutes of mixing, the mixture was taken out and pelletized. This material was then blended with PS at 165° C. After 5 minutes of mixing, SBS was added to the melt and further mixed for another 5 minutes. We refer to this procedure as the two-step crosslinking process.

Mechanical Tests

Test specimens for tensile and impact measurements were prepared by a small injection molding machine (Morgan Press) at processing temperatures of 210–230° C. Dumbbell-shape specimens (ASTM D638) were used for tensile measurements and rectangular-shape specimens (ASTM D256) were used for impact tests. Tensile testing was performed with an Instron tester (Model 5567), at a cross head speed of 20 mm/min. Notched impact strength was determined by the Izod method with a Tinius Olsen impact tester (Model 92T).

Characterization

The fracture surface morphology of the notched impact specimens was studied with a JEOL JSM-6300 scanning electron microscope (SEM). The transmission electron microscopy study was performed with a JEOL JEM 100 CXII transmission electron microscope of an acceleration voltage of 100 KV. The specimens were prepared with an ultra-cryomicrotome (Leica); and the thin sections were stained with $RuO_4$.

Process selection

Table 1 gives a summary of the mechanical properties of PS/PE blends prepared by various processing methods. In each sample, the PE to PS weight ratio was 1 to 4; and each incorporated about 10 weight % (wt %) SBS, and 0.05 wt % DCP (wt % is calculated with respect to the total weight of PS and PE; unless otherwise specified, all quantities expressed as per cent (%) are weight %).

The impact strength, tensile strength and elongation-at-break of the PS/PE blend are 13.8 J/m, 22.4 MPa, and 5%, respectively. Addition of SBS as the compatibilizer increases the impact strength and elongation of the blend (PS/PE/SBS) to 28.1 J/m and 12%, respectively. The mechanical properties of this blend even with the compatibilizer are not much better than PS probably due to weak interaction between the PE and butadiene component of SBS.

A PS/PE (20/80) blend containing 10 wt % SBS was prepared by mixing PE, PS and SBS and 0.05 wt % of DCP in the mixer at 165° C. for 15 min. The mechanical properties of this blend (PS+PE+SBS+DCP) are shown in Table 1. Its impact strength, tensile strength and elongation-at-break are 14.7 J/m, 23.2 MPa, and 8%, respectively. Clearly these values are much lower than those of the blends prepared by the other crosslinking processes. This might result from the fact that, during the single-crosslinking step, crosslinking occurs mainly in the butadiene component of SBS and inter-crosslinking between PE and the butadiene component is minimal, leading to weak interfacial adhesion.

The blends (PS+PE+DCP/SBS, PE+DCP/PS+SBS, PE+DCP/PS+SBS, and PE+DCP/PS/SBS) were prepared by first crosslinking PE with DCP; that step was then followed by various mixing sequences.

The blend PE+DCP/PS/SBS is demonstrates some of the most desirable mechanical properties: its impact strength is greater than a commercial high-impact PS (HIPS). See Table 1.

In the preparation of PE+DCP/PS/SBS, all of the DCP is first dispersed in the PE phase. The addition of PS alone would not cause any significant crosslinking reaction between PS and PE, but results in a good dispersion of PE in the PS matrix. Upon the final addition of SBS to the melt, the residual free radicals in PE will react mostly with SBS upon mixing. The SBS then acts as a strong coupling agent between the PE and PS phases by crosslinking the butadiene component with the PE phase and intermixing the styrene component with the PS matrix.

Effect of SBS and DCP concentrations

Figure 2:
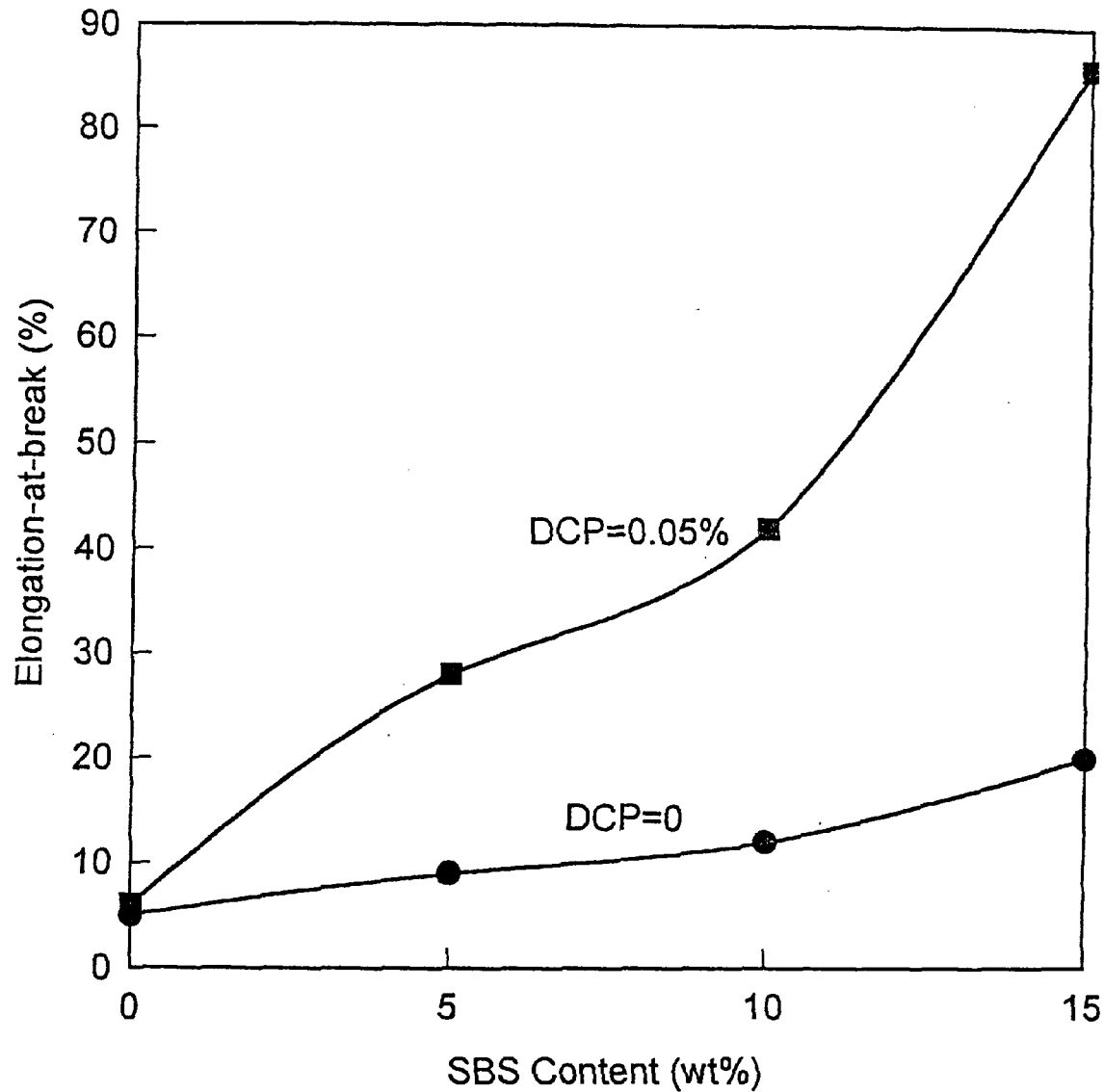
FIG. 2 is a graphical comparison of elongation-at-break of non-crosslinked PS/PE blends and the PS/PE blends prepared by the present two-step crosslink process as a function of SBS concentration.
Figure 3:
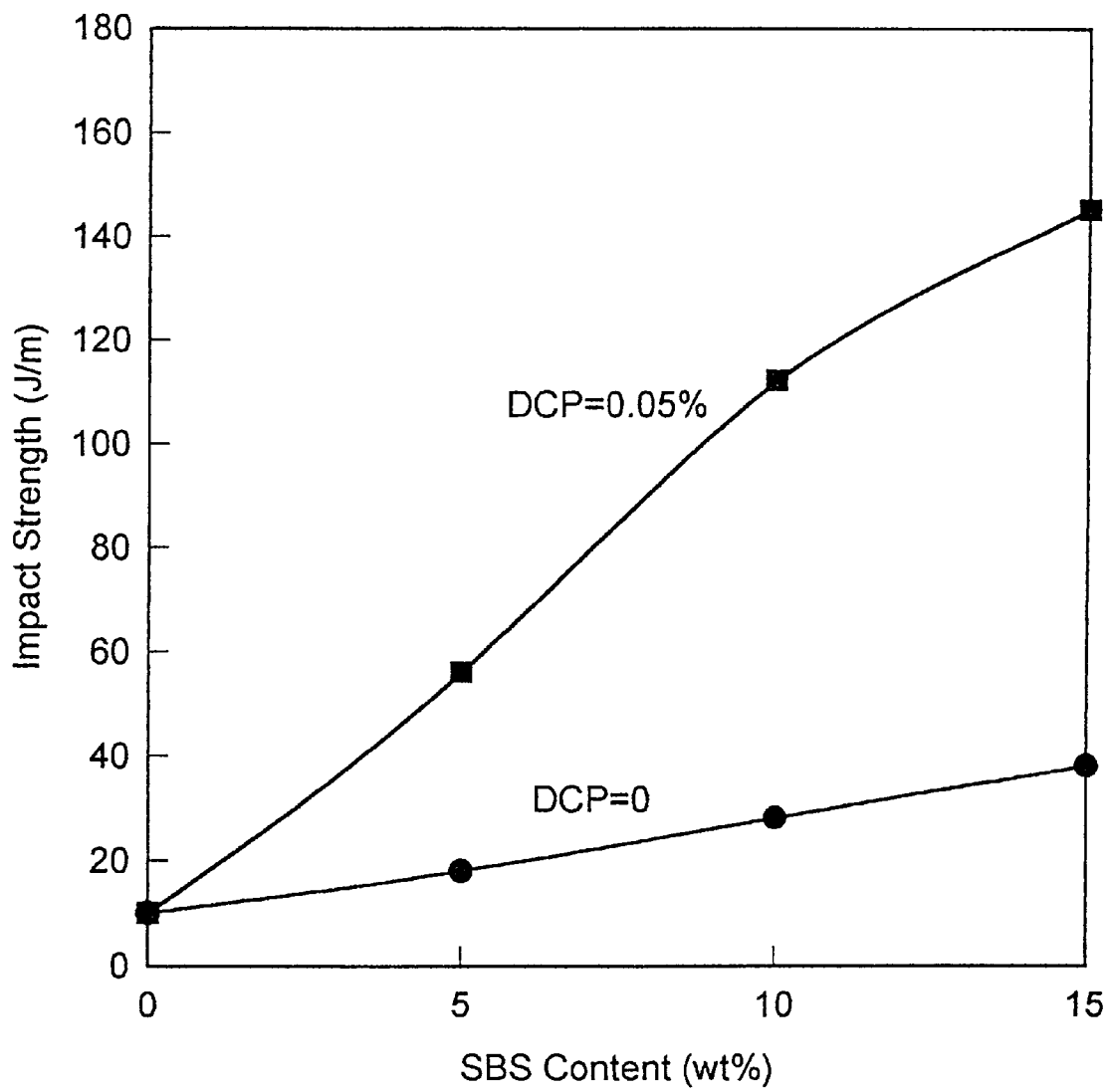
FIG. 3 is a graphical comparison of impact strength of non-crosslinked PS/PE blends and PS/PE blends prepared by the present two-step crosslink process as a function of SBS concentration.
Figure 4:
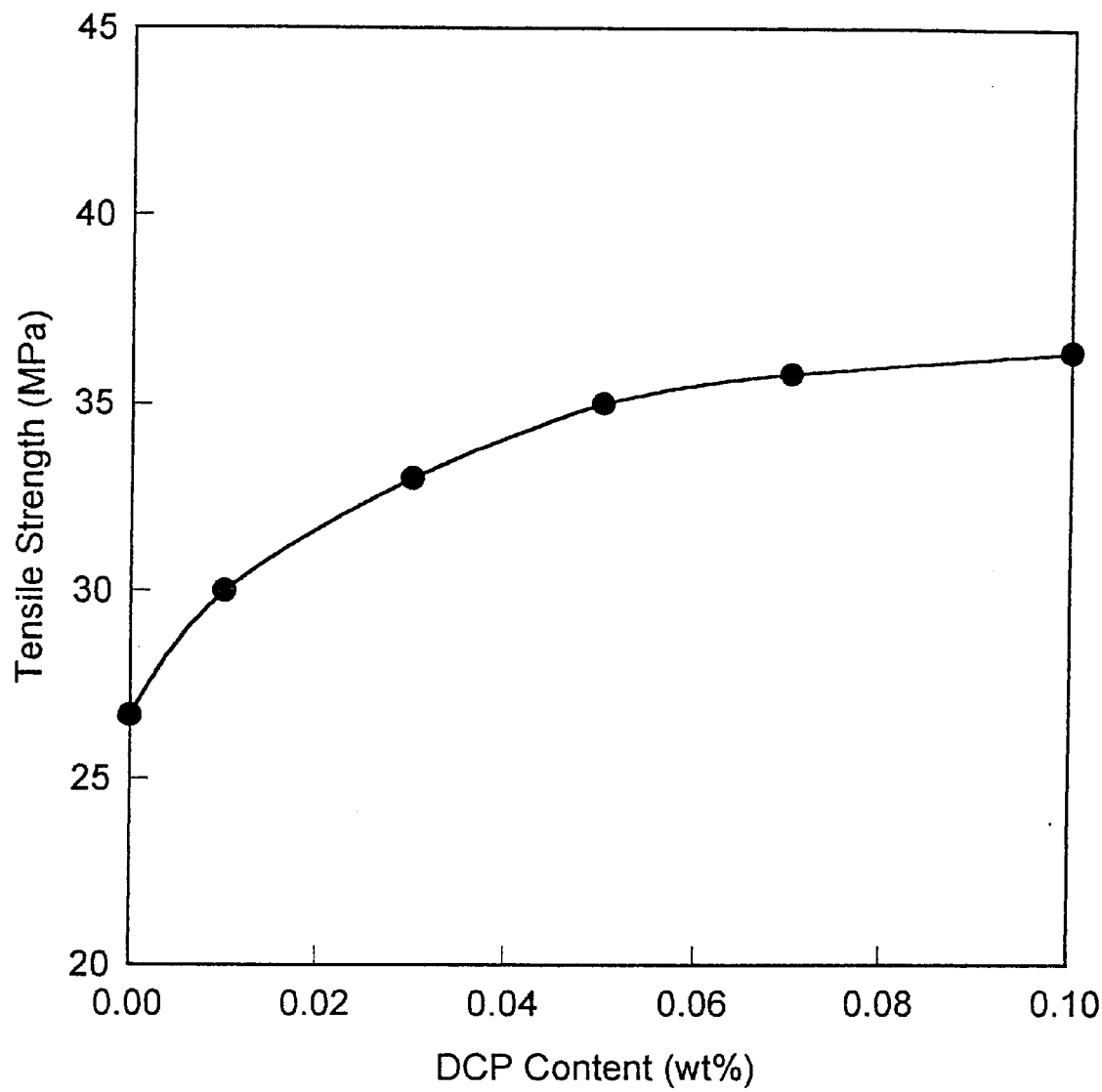
FIG. 4 is a graphical representation of tensile strength of the PS/PE blends with 10% SBS prepared by the present two-step crosslink process as a function of DCP concentration.

FIGS. 1–3 show the mechanical properties of the non-crosslinked PS/PE and the PS/PE blends prepared by the two-step crosslinking process with the SES content varying from 0 to 15 wt %. For the non-crosslinked PS/PE blends, the addition of SBS only shows a slight improvement in the mechanical properties. These results indicate that in this system SBS is not an effective compatibilizer, as it is well demonstrated in the literature.

Our analysis of a TEM micrograph of the PS/PE blend with 10 wt % of SBS shows that, of the three components in the blend, only butadiene has double bonds which could be easily stained by $RuO_4$. Close examination of the micrograph reveals that SBS segregates at the Interface between PE and PS. However, only slight improvement in impact strength, tensile properties, and elongation-at-break results because the interaction between butadiene and polyethylene is weak. FIGS. 1–3 also show that the mechanical properties of the blends (using 0.05 wt % DCP) prepared by the two-step crosslinking process are significantly enhanced. In particular the impact strength and elongation-at-break increase dramatically when the concentration of SBS increases.

A TEM micrograph for the blend containing 10 wt % of SBS shows the presence of SBS at the interface of PE and PS; and that the domain sizes of PE are reduced. The significant increase in the impact strength and elongation-at-break is attributed to the crosslinking between PE and SBS. It is well recognized that strong interfacial adhesion in a multiphase-structure blend gives rise to an increase of impact strength. See, e.g., T. Bremner and A. Rudin, *Plast. Rubb. Process Appl.* 13, 61 (1990). The tensile strength of the blends also increases as a function of the SBS concentration up to 10 wt % of SBS and then decreases on further increases of the SBS concentration. This is consistent with the fact that a large amount of SBS at the interface of PE and PS will undoubtedly reduce the tensile strength of the blends.

Figure 5:
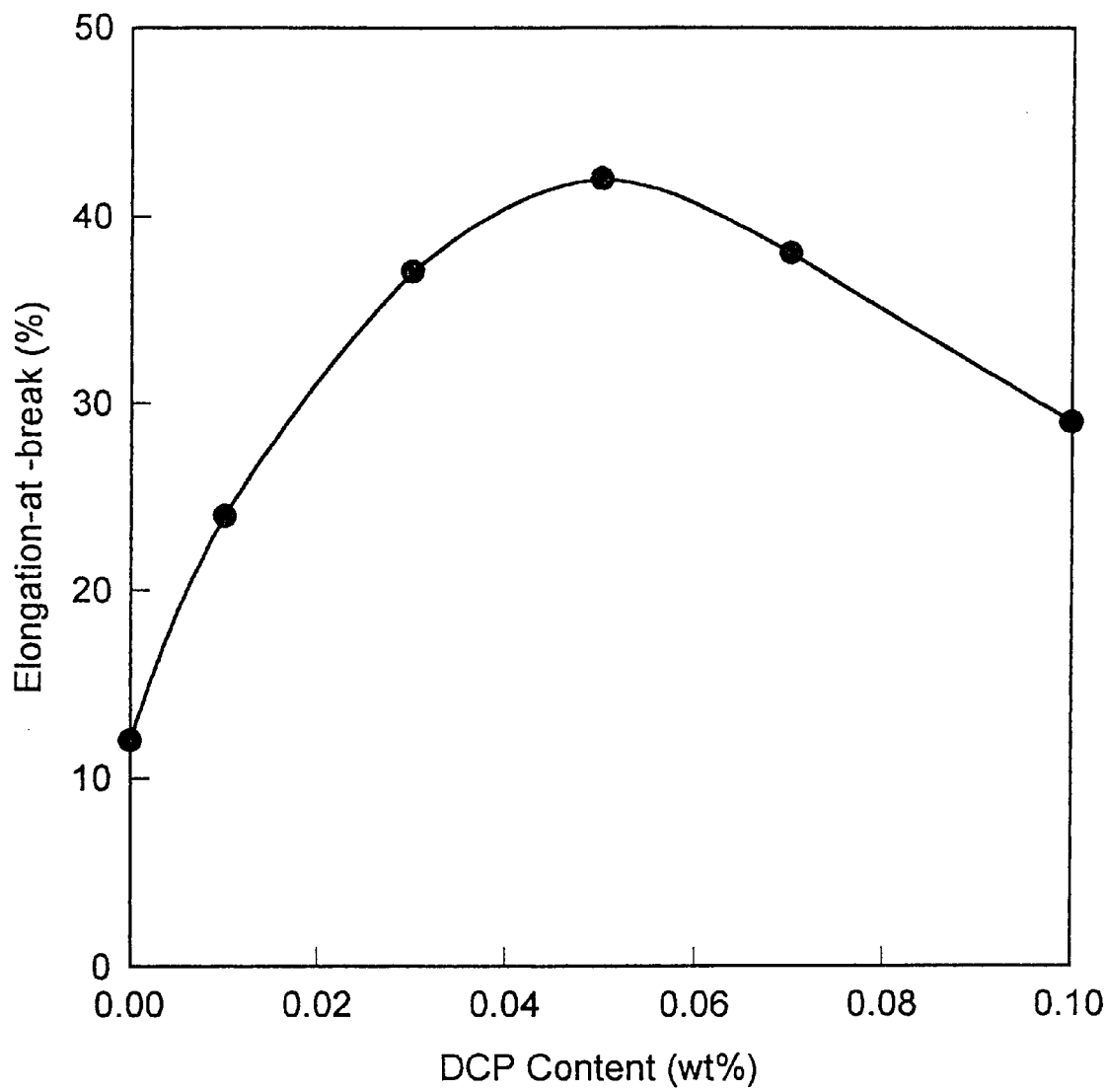
FIG. 5 is a graphical representation of elongation-at-break of PS/PE blends with 10% SBS prepared by the present two-step crosslink process as a function of DCP concentration.
Figure 6:
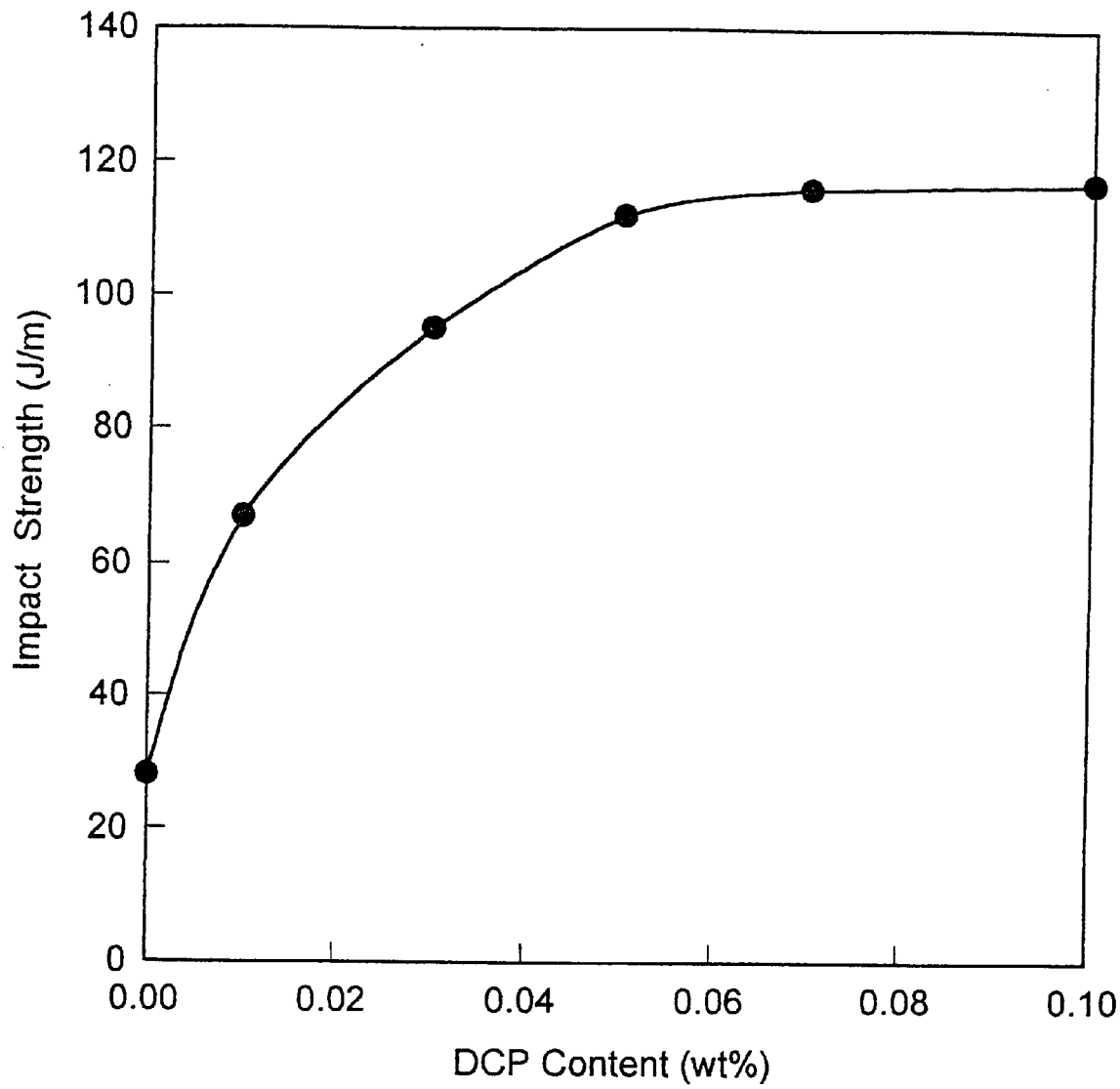
FIG. 6 is a graphical representation of impact strength of PS/PE blends with 10% SBS prepared by the present two-step crosslink process as a function of DCP concentration.

FIGS. 5–6 show the effects of the DCP content on the mechanical properties of the blend containing 10 wt % SBS. Both impact and tensile strengths increase as the DCP concentration increases. However, the increase is relatively small when the concentration of DCP is more than 0.05 wt %. In addition, the elongation-at-break reaches a maximum at 0.05 wt % of DCP as it is well known that any excess degree of crosslinking will reduce the elongation-at-break of a polymer. From these results, we can conclude that 0.05 wt % of DCP is the optimal concentration for this blend.

Our analysis of SEM micrographs of the non-crosslinked and crosslinked PS/PE blends with and without SBS show detachment of the PE phase from the PS matrix and that there is no indication of adhesion between these two polymers. The morphology is typical of that of incompatible blends. However, different shapes of the PE phase are observed. This may be due to the fact that crosslinking has rendered PE more difficult to deform during the high shear injection molding process. See, e.g., J. W. The and A. Rudin, *Polym. Eng. Sci.* 32, 1678 (1992); and N. Alle and J. L. Jorgensen, *Rheol. Acta.* 19, 104 (1980) (incorporated herein by reference). When 10 wt % of SBS is added to the uncrosslinked PS/PE blend, a finer dispersion of the PE phase is observed. Such finer dispersion of the PE phase in the matrix only brings about slight improvement in the mechanical properties due to the weak interaction between PE and SBS. However, when the blend was prepared by the two-step crosslinking procedure with 10 wt % of SBS, a substantially different morphology is observed. Products from that procedure illustrate strong plastic deformation of the matrix, accompanied by high shear deformation of PE particles. These morphologies are attributed to the crosslinking between the PE and the butadiene component of the SBS.

TABLE 1

The Mechanical Properties of PS/PE Blends
As A Function of Processing Conditions

| Blend Sample | Impact strength (J/m) | Tensile strength at break (Mpa) | Elongation-at-break (%) |
| --- | --- | --- | --- |
| PS | 22 | 42 | 2 |
| PS/PE | 13.8 | 22.4 | 5 |
| PS/PE/SBS | 28.1 | 26.7 | 12 |
| PS + PE + SBS + DCp[a] | 14.6 | 23.2 | 7.8 |
| PS = PE = DCP/SBS[b] | 50.6 | 29.5 | 26 |
| PE = DCP/PS + SBS[c] | 40.7 | 26.8 | 23 |
| PE + DCP/PS/SBS[d] | 115.7 | 35 | 42 |
| HIPS[e] | 76 | | |

[a] = All the components were mixed together.
[b] = PS, PE, and DCP were mixed first, and then SBS was added.
[c] = PE was mixed with DCP and then PS and SBS were added together.
[d] = PE and DCP were mixed, and then PS was added and mixed for 5 min, and finally SBS was added.
[e] = Austrex 5300 (Huntsman)

The two-step crosslinking process of the present invention is an effective and facile method for compatibilizing PS/PE blends. The process exploits SBS as the coupling agent between PE and PS, and coupling is effected in the presence of DCP. The stable blends produced by the process of the present invention possess improved impact strength, elongation-at-break, and tensile strength. This process can be exploited in other blend systems containing at least one component and a compatibilizer that are crosslinkable.

What is claimed is:

1. A method for creating a durable cross-linked polymer blend of otherwise incompatible polymers comprising:
   a. creating a melt by mixing dicumyl peroxide and a polyolefin selected from the group consisting of polyethylene, polypropylene, and mixtures thereof in a heated vessel, said polyolefin being partially crosslinked;
   b. creating a subsequent melt by mixing the product of step a with a homopolymer of a monovinyl substituted aromatic compound in a heated vessel; and
   c. adding a block copolymer to the melt of step b with continued mixing and crosslinking said block copolymer with said polyolefin.

2. A method for creating a durable cross-linked polymer blend of otherwise incompatible polymers comprising:
   a. creating a melt of dicumyl peroxide and a polyolefin selected from the group consisting of polyethylene, polypropylene, and mixtures thereof in a vessel heated to about 165° C. and mixing said melt for about 5 minutes, said polyolefin being partially crosslinked;
   b. cooling and solidifying the melt of step a;
   c. creating a melt by mixing the solidified product of step b and a polystyrene in a vessel heated to about 165° C. for about 5 minutes; and
   d. adding to the melt a styrene-butadiene-styrene block copolymer and mixing further under heat for about 5 minutes, crosslinking said block copolymer with said polyolefin.

3. The method of claim 2, wherein the weight ratio of polystyrene/polyethylene is 80/20.

4. The method of claim 2, wherein the SBS content is from about 5 wt % to about 15 wt %.

5. The method of claim 2, wherein the DCP content is from about 0.01 to about 0.1 wt %.

6. The method of claim 2, wherein the polyethylene employed is a low density polyethylene.

7. A polyethylene/polystyrene blend having improved mechanical properties formed by first creating a melt of about 20 wt % polyethylene and about 0.01 to about 1.0 wt % dicumyl peroxide; creating a subsequent melt by combining the product of the melt of polyethylene/dicumyl peroxide with about 80 wt % of a polystyrene; and adding to that melt about 5 wt % to about 15 wt % styrene-butadiene-styrene block copolymer; and wherein the resulting blend has the following mechanical properties: impact strength of at least about 100 J/m; tensile strength of at least about 30 MPa; and elongation at break of at least about 40%.

8. A polyethylene/polystyrene blend having improved mechanical properties formed by first creating a melt of about 20 wt % polyethylene and about 0.01 to about 0.1 wt % dicumyl peroxide; creating a subsequent melt by combining the product of the melt of polyethylene/dicumyl peroxide with about 80 wt % of a polystyrene; and adding to that melt about 5 to about 15 wt % styrene-butadiene-styrene block copolymer; and wherein the resulting blend has the following mechanical properties: impact strength of about 115 J/m; tensile strength of about 35 MPa; and elongation at break of about 42%.

\* \* \* \* \*